United States Patent [19]

Kujawski

[11] Patent Number: 5,319,837
[45] Date of Patent: Jun. 14, 1994

[54] TUBE BUNDLE CLIP

[75] Inventor: Rick A. Kujawski, Mount Clemens, Mich.

[73] Assignee: Bundy Corporation, Warren, Mich.

[21] Appl. No.: 959,762

[22] Filed: Oct. 13, 1992

[51] Int. Cl.$^5$ ................................ F16L 3/10
[52] U.S. Cl. ........................ 24/16 R; 24/528
[58] Field of Search ............ 248/68.1, 74.1, 74.3; 24/16 R, 459, 528

[56] References Cited

U.S. PATENT DOCUMENTS

| | | | |
|---|---|---|---|
| 4,148,113 | 4/1979 | Dvorachek | 24/16 R |
| 4,167,211 | 9/1979 | Haller | 248/68.1 X |
| 4,267,994 | 5/1981 | Lynch et al. | 248/74.1 X |
| 4,775,121 | 10/1988 | Carty | 248/74.3 X |

*Primary Examiner*—James R. Brittain
*Attorney, Agent, or Firm*—Barnes, Kisselle, Raisch, Choate, Whittemore & Hulbert

[57] ABSTRACT

Clips for retaining tubes in a spaced apart relationship. Each clip has a body with generally U-shaped recesses in which the tubes are received and a retainer cover slidably received on the body and movable from an open position to a closed position overlying the recesses and retaining the tubes therein. The cover is releasably secured in the closed position by a latch and preferably releasably retained on the body by a detent.

21 Claims, 3 Drawing Sheets

TUBE BUNDLE CLIP

FIELD OF THE INVENTION

This invention relates to devices for holding or gripping objects and more particularly to a clip for retaining tubes in spaced apart relationship.

BACKGROUND

Clips have been used to retain and support tubular lines such as hydraulic brake lines or fuel lines which run along the undercarriage of a vehicle. Metal brackets have been used to individually or in bundles secure each line to the vehicle undercarriage. Unfortunately such brackets are susceptible to corrosion and fatigue which can cause bracket failure leaving a tube previously retained by the bracket unsupported. Over time, unsupported tubes can rupture possibly causing brake failure or dangerously leaking fuel. Metal clips are also disadvantageous because their rigid mounting to the undercarriage makes any servicing of the tubes carried by the brackets very difficult without destroying the bracket requiring replacement.

More recently, plastic clips have been used to retain and support brake and fuel lines. These clips have been utilized because of their non-corrosive and light-weight characteristics and economical manufacture. A first type of clip commonly used has a body with one or more recesses for receiving a tube therein. To retain the tube when received within a recess, one finger on each side of the recess forms a generally V-shaped entry channel to the recess allowing a tube to be snapped into the recess with the bottom portion of each finger generally abutting against the outer peripheral surface of the tube to prevent removal of the tube from the recess. The second type of clip has a two piece body connected together by a living hinge and a latch. There are recesses in each piece which generally axially align to form cylindrical tube retaining channels when one piece is placed in overlapping fashion over the opposite piece. In use, tubes are placed in one set of recesses and the two hinged pieces are pivotally moved and latched together with the latch.

When retained by a clip, tubes under load can transmit a considerable amount of force to the clip along a line generally perpendicular to the axis of each tube. In this dynamic state each tube can transmit a force in a different direction thereby possibly increasing the amount of force transmitted to the clip latching mechanism and creating a moment along an axis where the clip generally engages each tube. Since the latching mechanism engages the clip body or directly retains each tube along a direction generally parallel to the axis of each tube, a sufficient amount of force or a moment transmitted to the clip generally perpendicular to the latch mechanism can cause the latch to disengage and free one or more tubes.

Typically, these clips are constructed of nylon which may become brittle with age. As a clip of nylon ages, less force may be required to disengage a latch which has degraded or become brittle. A living hinge in this state can also fail releasing the tubes from the clip. Furthermore, servicing of a tube, such as replacing a brake or a fuel line, requires the disassembly of the clip to remove the tube possibly weakening an embrittled latch mechanism or the living hinge. Later when reassembled in such a weakened state the clip is more susceptible to failure.

The problems commonly encountered with these clip designs such as corrosion, fatigue, or embrittlement can cause the clip to fail releasing the tubes retained by it. As a result of the locking mechanisms of the plastic clips securing the tube to the clip body along a direction generally parallel to the axis of each tube, dynamic loading such as during vehicle operation can cause the latching mechanism to disengage releasing the tubes retained by the clip.

SUMMARY OF THE INVENTION

A clip for releasably retaining at least two tubes in spaced apart relationship. The clip has a body with at least two recesses open to the exterior of the body, each for receiving a tube therein. A retainer is slidably received on the body of the clip in a first open position permitting a tube to be assembled in each recess of the body. To securely, yet releasably, retain each tube, the retainer can be slidably moved to a second closed position where the retainer overlies each recess of the body. A latch is provided for releasably securing the retainer to the clip body when the retainer is in the closed position.

To slidably guide the retainer on the clip body while securely preventing removal of the retainer therefrom, a pair of tracks slidably engage with complementary channels. The retainer is releasably retained in its closed position by a pawl on the retainer which engages with a detent on the body. Preferably a detent is also provided to slidably retain the retainer on the body in an open position for shipping the clip and facilitating assembly. A mount may be carried by the retainer for mounting the retainer to the undercarriage of a vehicle.

Objects, features, and advantages of this invention are to provide a clip which securely and yet releasably retains tubes in a spaced apart relationship, has a retainer positively and slidably connected to the clip body, is lightweight, corrosion resistant, strong, rugged, durable, and of simple design and economical to manufacture, assemble and install.

DETAILED DESCRIPTION OF THE INVENTION

Figure 1:
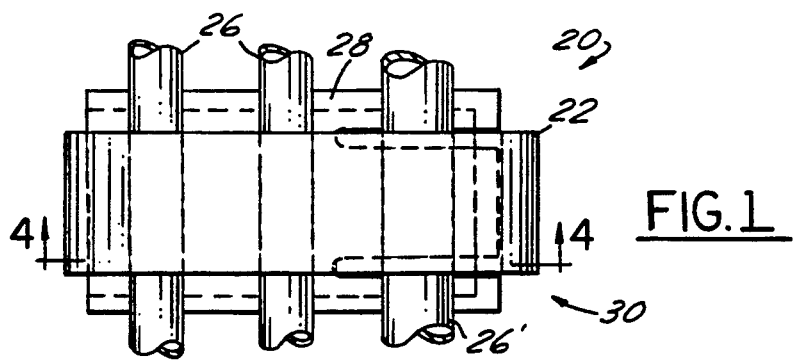
FIG. 1 is a top plan view of a tube bundle clip of this invention with a retainer in a closed position on the clip body.
Figure 2:
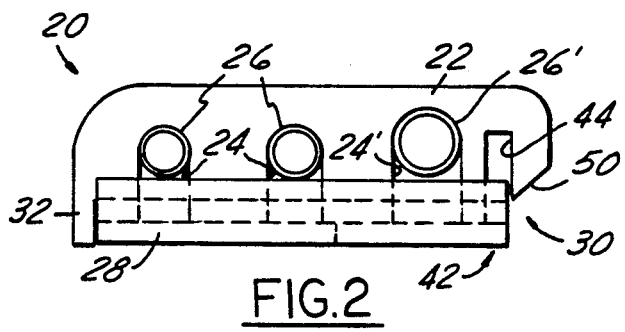
FIG. 2 is a side elevational view of the clip assembly with the retainer in the closed position.

Referring in more detail to the drawings, FIGS. 1-7 illustrate a tube bundle clip 20 of this invention and having an elongate body 22 with recesses 24 open to the exterior of the body 22 for each receiving a tube 26 to be retained therein. A retainer 28 is slidably received on the body 22 in an open position (FIG. 6) permitting a tube 26 to be received in each recess 24 and can be moved to a closed position (FIG. 1) overlying each recess 24 to releasably retain all tubes received by the body 22. Preferably, the clip 20 has a latch 30 for releasably securing the retainer 28 to the body 22 when in the closed position. A stop 32 may also be provided to prevent the retainer 28 from moving beyond the closed position.

Preferably, at least two recesses 24 are spaced apart longitudinally along the clip body 22 to prevent tubes 26 received within the recesses 24 from undesirably contacting each other during vehicle operation. Each recess 24 has a pair of sidewalls 34 formed from the clip body 22 and extends transversely the complete width of the body to receive a tube completely therethrough. Each recess 24 is also of a sufficient depth to receive a tube without the tube interfering with the slide action of the retainer 28 on the body 22. The bottom 36 of each recess 24 is preferably generally semi-circular to conform to the cylindrical tube cross-section. When a tube 26 is received in a recess 24 of the clip 20, the sidewalls 34, bottom 36, and retainer 28, when in the closed position, provide support to keep the tube 26 generally axially aligned within the recess 24 to prevent damage to the tube 26 during vehicle operation. If more support is desired or to dampen vibration transmitted through a retained tube 26, one or more recesses 24 may be designed to have a slight interference fit with a tube 26 received therein.

The width of each recess 24 may be varied to accomodate tubes of different diameter. As shown in FIG. 1, a smaller width recess 24 may be necessary to receive and retain, for example, a hydraulic brake line 26 and a larger recess 24' may be required to accomodate a larger diameter tube 26' such as a fuel line.

Figure 5:
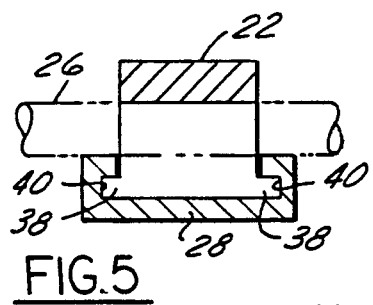
FIG. 5 is a sectional front view of the clip assembly taken along line 5—5 of FIG. 4.
Figure 6:
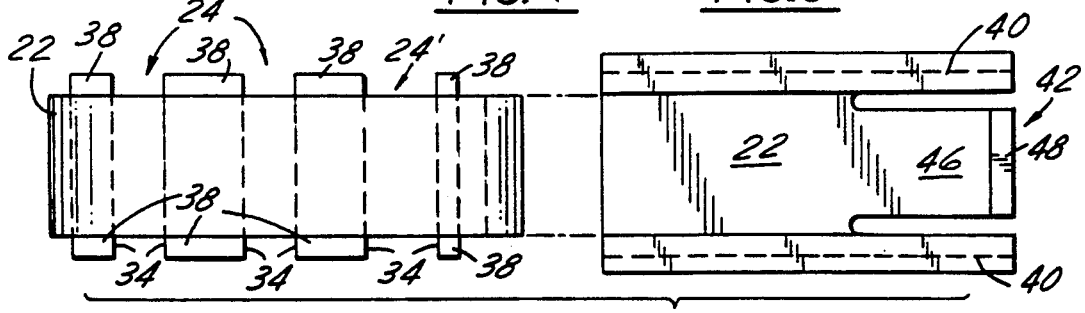
FIG. 6 is an exploded top plan view of the clip assembly showing the retainer in an open position.
Figure 7:
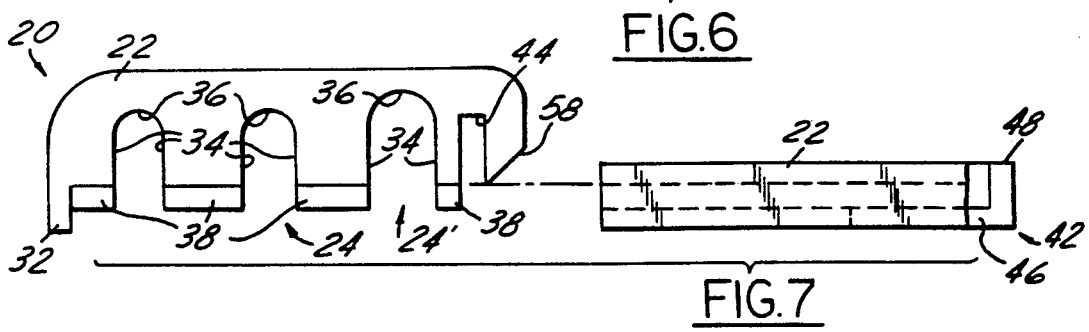
FIG. 7 is an exploded side view of the clip assembly with the retainer in the open position.
Figure 8:
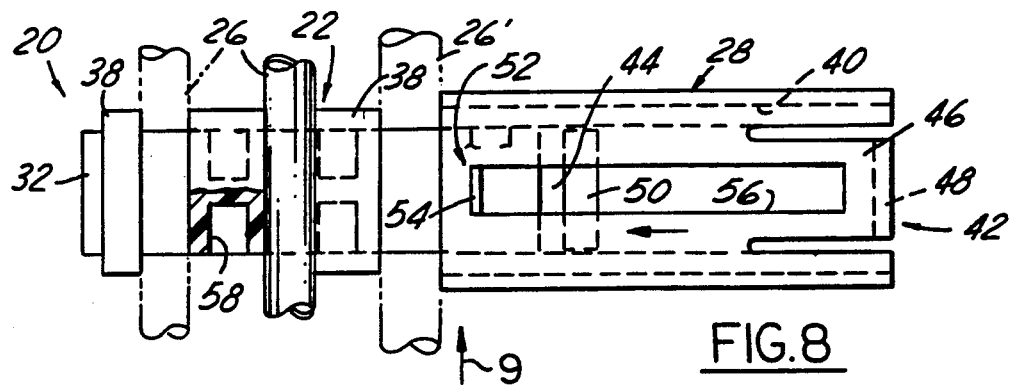
FIG. 8 is a bottom view of a second clip embodiment showing the body in partial section and the retainer releasably retained on the body in an open position.
Figure 9:
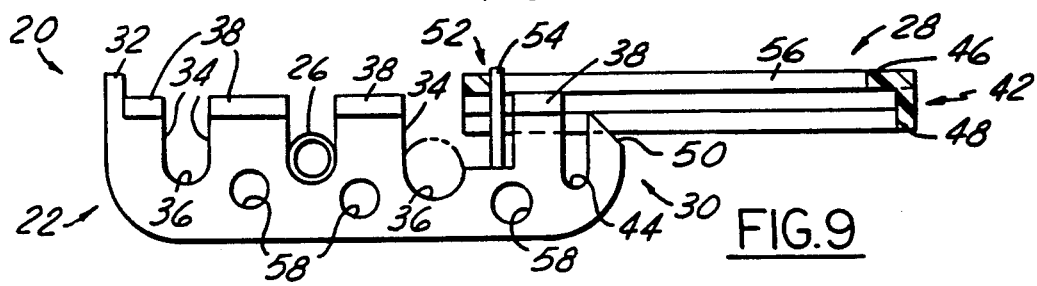
FIG. 9 is a side view of the second clip assembly in the direction of line 9 of FIG. 8 showing the retainer in section and retained in the open position.
Figure 10:
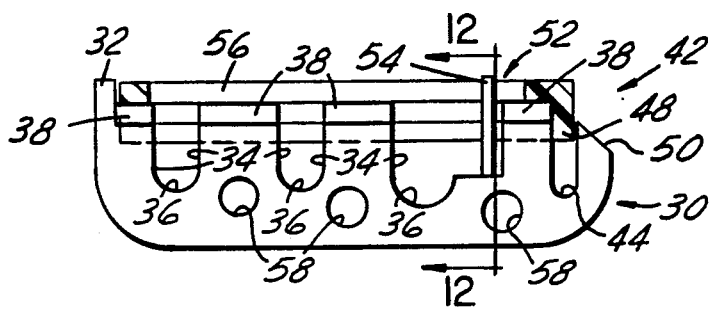
FIG. 10 is a side view of the second clip assembly with the retainer in section and shown in the closed position on the clip body.
Figure 11:
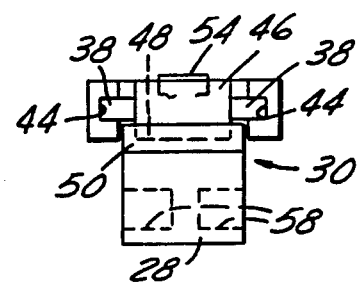
FIG. 11 is a front view of the second clip assembly.
Figure 12:
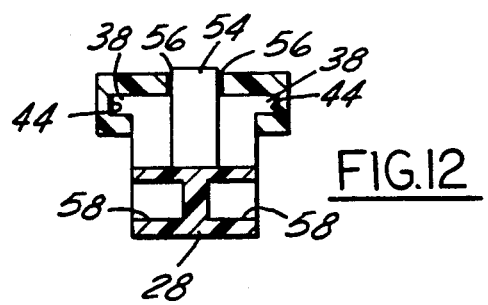
FIG. 12 is a sectional front view of the second clip assembly taken along line 12—12 of FIG. 10.
Figure 13:
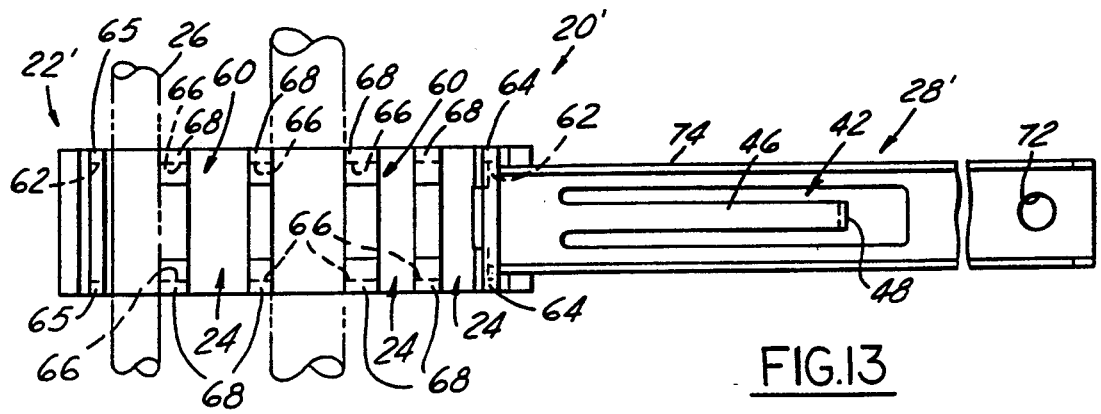
FIG. 13 is a top view of a third clip embodiment with the retainer shown releasably retained in an open position.

The retainer 28 is slidably received on the clip body 22 over a pair of discontinuous tracks 38 extending transversely outwardly from each side of the top of the clip body 22. As shown in FIGS. 6 and 7, each track portion 38 extends outwardly from parts of the body 22 between recesses 24 or a recess 24 and one end of the body 22. The retainer 28 has a longitudually extending and inwardly opening complementary channel 40 on each side for slidably engaging the tracks 38 of the body 22 (FIG. 5). This permits sliding retainer 28 movement relative to the longitudinal axis of the body 22 while preventing the retainer 28 from being disassembled from the body 22 by a force from one or more tubes 26 received in the recesses 24 of the body 22 acting in a direction generally perpendicular to the longitudinal axis of the body 22 and bearing on the retainer 28.

Figure 3:
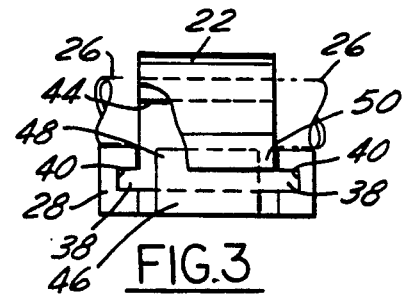
FIG. 3 is a partial sectional front view of the clip body with the retainer in the closed position.
Figure 4:
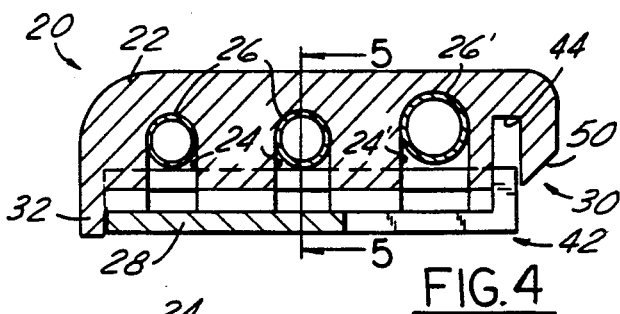
FIG. 4 is a side view of the clip assembly with a portion of the retainer removed to show a track carried by the clip body.

The retainer 28 is releasably secured in its closed position on the body 22 by the latch 30. As shown in FIGS. 3 and 4, the latch has a yieldably biased pawl 42 releasably engageable with a slot 44 adjacent one end of the body. The pawl 42 has a flexible finger 46 which yieldably biases a downturned tip 48 on its free end into the slot 44. As the retainer 28 moves towards its closed position, the tip 48 is raised and cammed into the slot 44 by an inclined ramp 50 on the free end of the body 22. To insure that the tip 48 will be received in the slot 44, the other end of the retainer 28 bears on the stop 32 on the body 22 when the tip 48 of the finger 46 is disposed over and aligned with the slot 44. To release the retainer 28 for moving it to the open position, the tip 48 on the free end of the finger 46 can be manually raised to remove it from the slot 44.

FIGS. 8-12 illustrate a modified clip 20 with a retainer 28 slidably received on a body 22 and releasably retained in its open position by a detent 52. This facilitates preassembling the retainer 28 on the body 22 for packaging, shipping and storing the clip 20 and simplifies securing a tube 26 in the clip 20 by simply moving the retainer 28 to its fully closed position. The detent 52 has a resilient tab 54 cantilevered in the body 22 with its free end projecting into an elongate channel or slot 56 through the retainer 28 to abut an end of the slot 56 to retain the retainer 28 on the body 22 in its fully opened position. The slot 56 is of sufficient length to allow the retainer 28 to slidably move on the body 22 from its open to its closed position. The tab 54 is flexible and somewhat resilient to allow the retainer 28 to be assembled onto the body 22 but it acts as a stop for abutting against the end of the slot 56 to releasably prevent removal of the retainer 28 from the body 22. To remove the retainer 28, the tab 54 may be either manually flexed so that its free end is removed from the slot 56 or sufficient force may be applied to the retainer 28 to flex or bend the upper portion of the tab 54 sufficiently to allow removal of the retainer 28. If desired, the amount of material in the molded body 22 may be reduced and cavities may be provided for mounting the body 22, by providing cylindrical recesses or blind holes 58 in each side of the body 22.

FIGS. 13-16 illustrate another form of a clip 20' with a retainer 28' slidably received in a passage 60 through a body 22'. Each tube 26 is received in one of a plurality of recesses 24 extending transversely through the body 22. As shown in FIGS. 13-16, the passage 60 in which the retainer 28' is slidably received is defined by aligned rectangular holes 62 through end wall portions 64,65 and T-shaped slots 66 through the intermediate wall portions 68 of the body 22' defining the recesses 24,24'.

Figure 14:
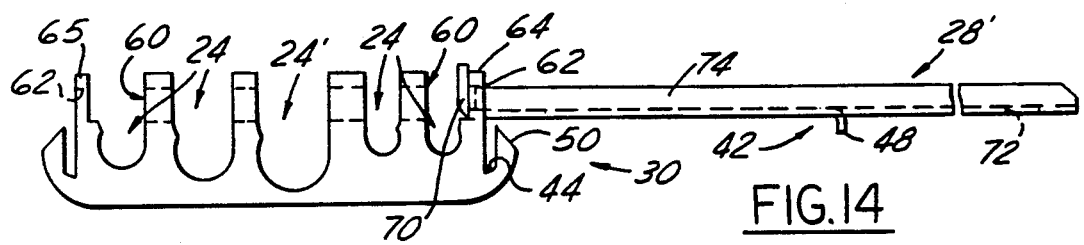
FIG. 14 is a side view of the clip assembly with the retainer in the open position.
Figure 15:
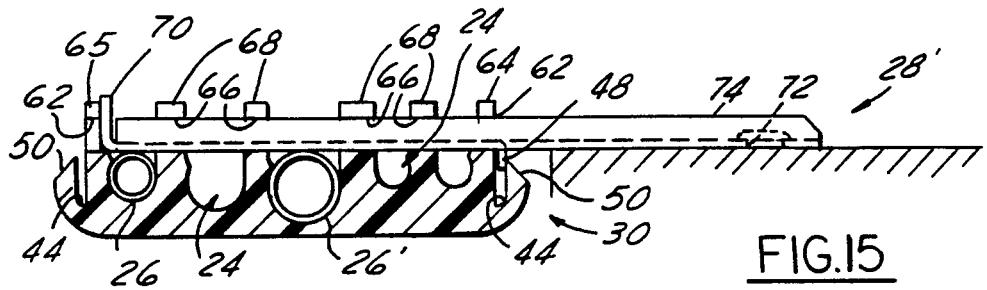
FIG. 15 is a sectional side view of the clip body with the retainer on the body in the closed position.
Figure 16:
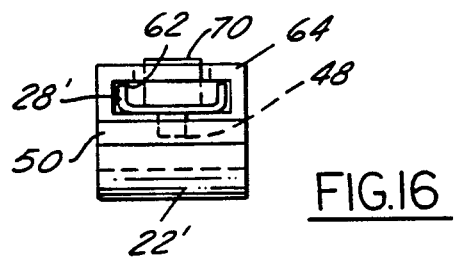
FIG. 16 is a front view of the third clip.

Preferably, the retainer 28' may be inserted into the passage 60 through either end of the body 22'. Preferably, the retainer 28' has a generally U-shaped cross section 22' with an upturned flanged track 74 running longitudinally along each edge of the retainer for slidably engaging with the complementary passage 60 of the body 22'. The retainer is also preferably releasably retained on the body 22' by an upturned tab 70 at one end which, as shown in FIG. 14, abuts one of the end wall portions 64 in the fully open position and the other end wall portion 65 in the fully closed position (FIG. 15). The retainer 28' is releasably locked in the fully closed position by a latch 30 having a tip 48 on an end of a spring finger 46 yieldably biased into one of the slots 44 at each end of the body 22'. The tip 48 of the finger 46 is raised and cammed into one of the slots 44 by an associated ramp 50 at each end of the body 22. Preferably, for attaching the clip 20' to the under carriage of a vehicle, a mounting hole 72 is provided through the free end of the retainer 28'.

Preferably, the retainer 28 and body 22 of each clip is injection molded 20 of a thermoplastic polyester blended with polycarbonate such as XENOY 6123 sold by General Electric Company. More generally however, both the retainer 28 and body 22 of the clip 20 could be constructed of phenolic, polyurethane, polyacrylic, rubber or some other plastic material. Alternatively, polyester alone, nylon or an acetal may be used for the manufacture of the clips. For applications requiring the retainer 28 to be mounted to the vehicle under carriage, it may be preferable to construct the retainer out of metal such as a SAE 1050–1080 spring steel.

In using the clip 20, the retainer 28 is initially located in an open position with respect to the recesses 24 in the body 22 by being either completely removed from the body 22 (FIG. 6) or releasably retained on the body 22 (FIGS. 8 and 13) for receiving a tube 26 in each recess 24 of the body 22. The tubes 26 are inserted and properly seated within the recesses 24, and then the retainer 28 is slidably moved on the body 22 to adjacent the closed position so that the retainer 28 overlies each recess 24 and tube 26. To releasably lock the retainer 28 on the body 22 and retain the tubes 26 within the recesses 24, the retainer 28 is moved farther onto the body 22 to the closed position where the tip 48 of the pawl 42 latches into the notch 44 and the retainer 28 generally abuts against the stop 32. Due to the bias of the resilient finger 46, the tip 48 is raised by the ramp 50 and then snaps into locking position in the groove 44. Should the tubes 26 require servicing or removal, the finger 46 of the pawl 42 may be flexed slightly until the tip 48 disengages from the notch 44 and then the retainer 28 may be slid relative to the body 22 to the open position.

I claim:

1. A clip for releasably retaining at least two tubes in a spaced apart relationship comprising:
    a body;
    at least two recesses open to the exterior of said body for receiving a tube therein;
    a retainer slidably received on said body in a first open position permitting a tube to be received in each recess of said at least two recesses and in a second closed position where said retainer overlies each recess and releasably retains each tube received in a recess; and
    a latch for releasably securing said retainer to said body when said retainer is in the closed position, said latch having a slot adjacent one end of said body and a pawl carried by said retainer for releasably engaging with said slot to releasably secure said retainer to said body when said retainer is slidably received on said body in the closed position.

2. The clip of claim 1 which also comprises, a detent carried by said body for releasably retaining said retainer on said body in the open position for permitting assembly of a tube in each recess and for facilitating assembly of said retainer over said body from the first open position to the second closed position to releasably retain each tube received in a recess.

3. The clip of claim 1 which also comprises a ramp adjacent said slot to ease entry of said pawl into engagement with said slot.

4. The clip of claim 1 wherein each recess of said at least two recesses is generally U-shaped for receiving a generally cylindrical tube therein.

5. The clip of claim 1 wherein one or more recesses of said at least two recesses are of different sizes to respectively receive tubes of varying size therein.

6. The clip of claim 1 which also comprises a detent for releasably retaining said retainer on said body and for preventing removal therefrom.

7. The clip of claim 6 wherein said detent is carried by said body for releasably retaining said retainer on said body in the open position and permits the retainer to be moved between the open and closed positions.

8. The clip of claim 6 wherein said detent is integrally molded with said body.

9. The clip of claim 6 wherein said detent is integral with said retainer.

10. A clip for releasably retaining at least two tubes in a spaced apart relationship comprising:
    a body;
    at least two recesses open to the exterior of said body for receiving a tube therein;
    a retainer slidably received on said body in a first open position permitting a tube to be received in each recess of said at least two recesses and in a second closed position where said retainer overlies each recess and releasably retains each tube received in a recess;
    a latch for releasably securing said retainer to said body when said retainer is in the closed position; and
    a stop adjacent one end of said body for preventing said retainer from slidably moving relative to said body beyond the closed position and preventing engagement of said latch.

11. The clip of claim 10 which also comprises stops adjacent both ends of said body for abutting with said retainer for preventing said retainer from slidably moving relative to said body beyond the fully opened and closed positions.

12. A clip for releasably retaining at least two tubes in a spaced apart relationship comprising:
    a body;
    at least two recesses open to the exterior of said body for receiving a tube therein;
    a retainer slidably received on said body in a first open position permitting a tube to be received in each recess of said at least two recesses and in a second closed position where said retainer overlies each recess and releasably retains each tube received in a recess;
    a latch for releasably securing said retainer to said body when said retainer is in the closed position;
    a pair of tracks carried by said body; and
    a pair of complementary channels carried by said retainer for slidably engaging with said tracks of said body for moving said retainer relative to said body in either direction generally parallel to the longitudinal axis of said body while securely restraining movement of said retainer relative to said body in a direction substantially perpendicular to the longitudinal axis of said body to prevent removal of all tubes received in said at least two recesses in said body when said retainer is in the closed position on said body.

13. The clip of claim 12 wherein each of said tracks comprises an outwardly extending flange running longitudinally along one edge of said body substantially the longitudinal length of said body and each of said channels is inturned generally facing the other said channel and running longitudinally along one edge of said retainer substantially the longitudinal length of said retainer for substantially interlocking with each of said flanges to permit movement of said retainer relative to said body in either direction substantially parallel to the longitudinal axis of said body while securely restraining movement of said retainer relative to said body in a direction generally perpendicular to the longitudinal axis of said body to securely prevent removal of all tubes received in said at least two recesses when said retainer is in the closed position on said body.

14. A clip for releasably retaining at least two tubes in a spaced apart relationship comprising:
  a body;
  at least two recesses open to the exterior of said body for receiving a tube therein;
  a retainer slidably received on said body in a first open position permitting a tube to be received in each recess of said at least two recesses and in a second closed position where said retainer overlies each recess and releasably retains each tube received in a recess;
  a latch for releasably securing said retainer to said body when said retainer is in the closed position;
  a pair of complementary channels carried by said body for slidably engaging with said tracks of said retainer for moving said retainer relative to said body in either direction generally parallel to the longitudinal axis of said body while securely restraining movement of said retainer relative to said body in a direction substantially perpendicular to the longitudinal axis of said body to securely prevent removal of all tubes received in said at least two recesses when said retainer is in the closed position on said body.

15. A clip for retaining at least two tubes in a spaced apart relationship comprising:
  a body;
  at least two recesses open to the exterior of said body for receiving a tube therein;
  a latch adjacent each end of said body for releasably securing a retainer to said body;
  a retainer slidably received on said body in an open position permitting a tube to be received in each recess of said at least two recesses and in a closed position where said retainer overlies each recess releasably retaining any tube received in a recess and is releasably engaged with one of said latches for releasably retaining said retainer on said body when said retainer is in the closed position.

16. The clip of claim 15 which also comprises a stop adjacent each end of said body for abutting with said retainer for preventing said retainer from moving beyond the closed position when in the closed position.

17. The clip of claim 15 which also comprises, at least one detent for releasably retaining said retainer on said body in the open position for permitting assembly of a tube in each recess and for facilitating assembly of said retainer over said body from the open position to the closed position with said retainer releasably engaged with one of said catches and overlying each recess releasably retaining all tubes received in said at least two recesses.

18. The clip of claim 17 wherein said at least one detent comprises a detent carried by said retainer.

19. The clip of claim 17 wherein said at least one detent comprises a detent carried by said body.

20. The clip of claim 15 which also comprises a pair of channels carried by said body for slidably engaging with said retainer for moving said retainer relative to said body in either direction generally parallel to the longitudinal axis of said body while securely restraining movement of said retainer relative to said body in a direction substantially perpendicular to the longitudinal axis of said body to prevent removal of any tube received in said at least two recesses in said body when said retainer is in the closed position on said body.

21. The clip of claim 20 wherein each of said channels is inturned generally facing the other of said channels and running longitudinally along one edge of said body substantially the longitudinal length of said body for substantially interlocking with said retainer to permit movement of said retainer relative to said body in either direction substantially parallel to the longitudinal axis of said body while securely restraining movement of said retainer relative to said body in a direction generally perpendicular to the longitudinal axis of said body to securely prevent removal of all tubes received in said at least two recesses when said retainer is in the closed position on said body.

* * * * *